J. J. BOAX.
PIPE THREADING MACHINE.
APPLICATION FILED SEPT. 4, 1914.

1,124,692.

Patented Jan. 12, 1915.
4 SHEETS—SHEET 1.

WITNESSES

INVENTOR
John J. Boax
by C. C. Linthicum
his Attorney

J. J. BOAX.
PIPE THREADING MACHINE.
APPLICATION FILED SEPT. 4, 1914.

1,124,692.

Patented Jan. 12, 1915.
4 SHEETS—SHEET 3.

WITNESSES
R. D. Littler
W. T. Holman

INVENTOR
John J. Boax
by C. C. Linthicum
his Attorney

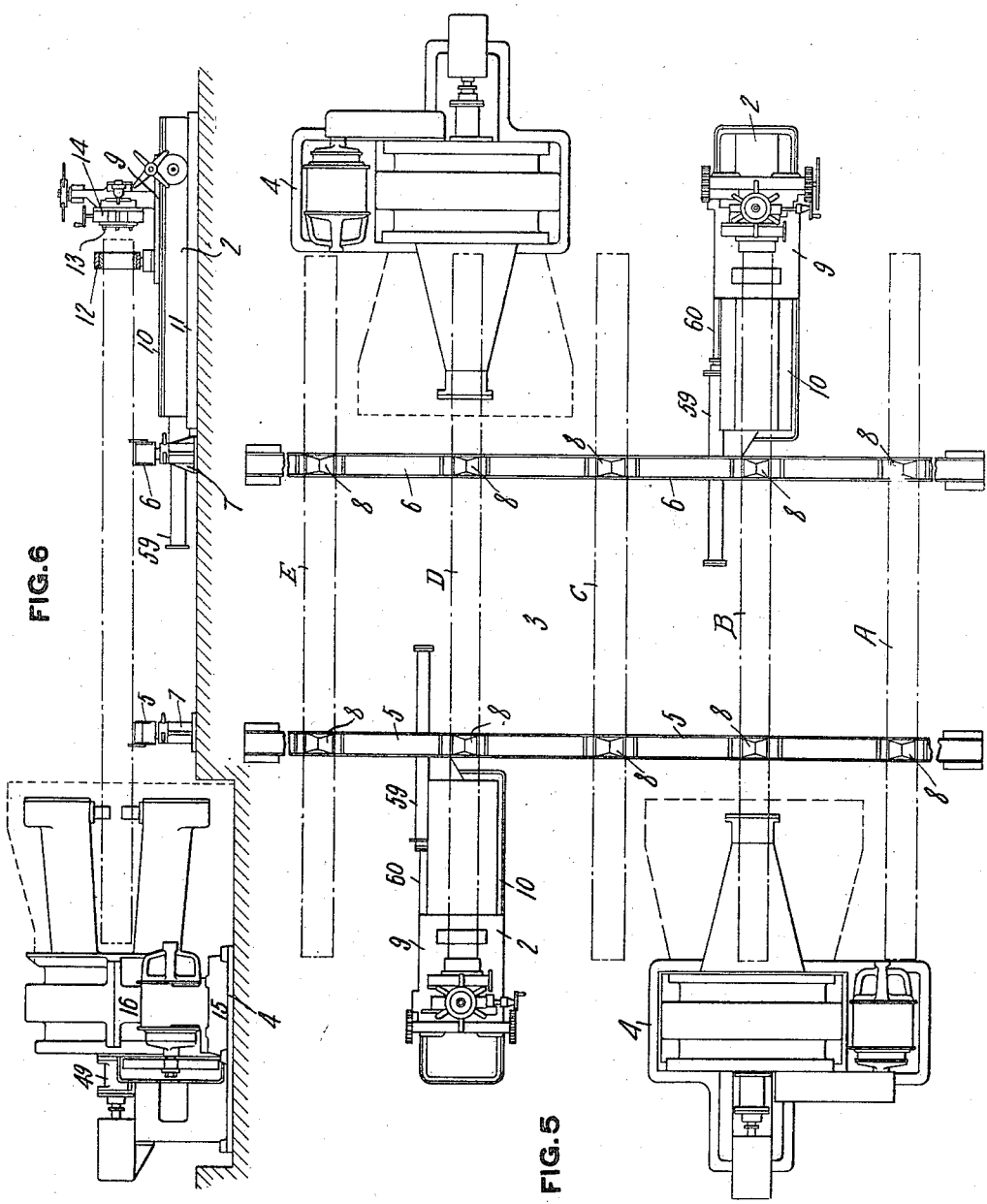

UNITED STATES PATENT OFFICE.

JOHN J. BOAX, OF McKEESPORT, PENNSYLVANIA, ASSIGNOR TO THE NATIONAL TUBE COMPANY, OF PITTSBURGH, PENNSYLVANIA, A CORPORATION OF NEW JERSEY.

PIPE-THREADING MACHINE.

1,124,692.  Specification of Letters Patent.  Patented Jan. 12, 1915.

Application filed September 4, 1914.  Serial No. 860,241.

*To all whom it may concern:*

Be it known that I, JOHN J. BOAX, a citizen of the United States, and resident of McKeesport, in the county of Allegheny and State of Pennsylvania, have invented certain new and useful Improvements in Pipe-Threading Machines, of which the following is a specification.

My invention relates to pipe threading machines used in cutting threads upon the ends of wrought metal pipes, tubes, and similar tubular goods.

One object of the invention is to provide a pipe threading machine having novel means whereby the pipe is grasped and held while being rotated in the pipe threading operations.

Another object of my invention is to provide a threading machine having novel means whereby the threads are cut in alinement on the pipe and the influence of irregularities in the pipe on the thread cutting operation is lessened and substantially eliminated.

Another object of my invention is to provide pipe threading machines having novel means whereby the necessity of lengthwise or endwise movement of the pipes in positioning the pipes to cut the threads is avoided and overcome.

A further object of the invention is to provide a pipe threading machine having novel means whereby the dies of the threading machine are moved into and out of operative engagement with the pipes in the pipe threading operations.

A still further object of the invention is to provide pipe threading machines arranged in a novel manner whereby the manual operation of threading the opposite ends of the pipes is lessened and reduced to a minimum.

Still further objects of my invention will be made apparent as the invention is more fully described hereinafter and is specifically pointed out in the appended claims.

Figure 1:
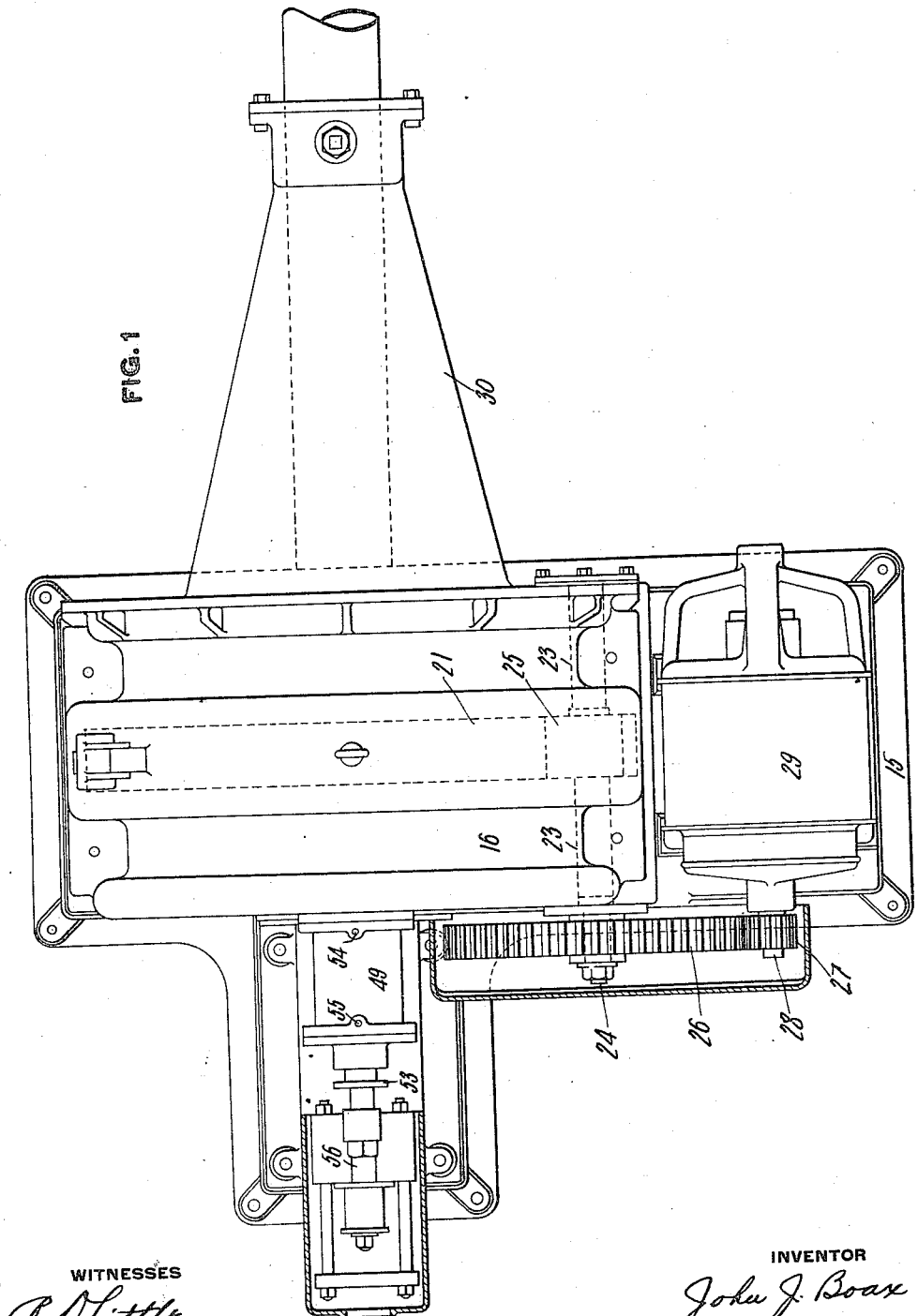
Figure 2:
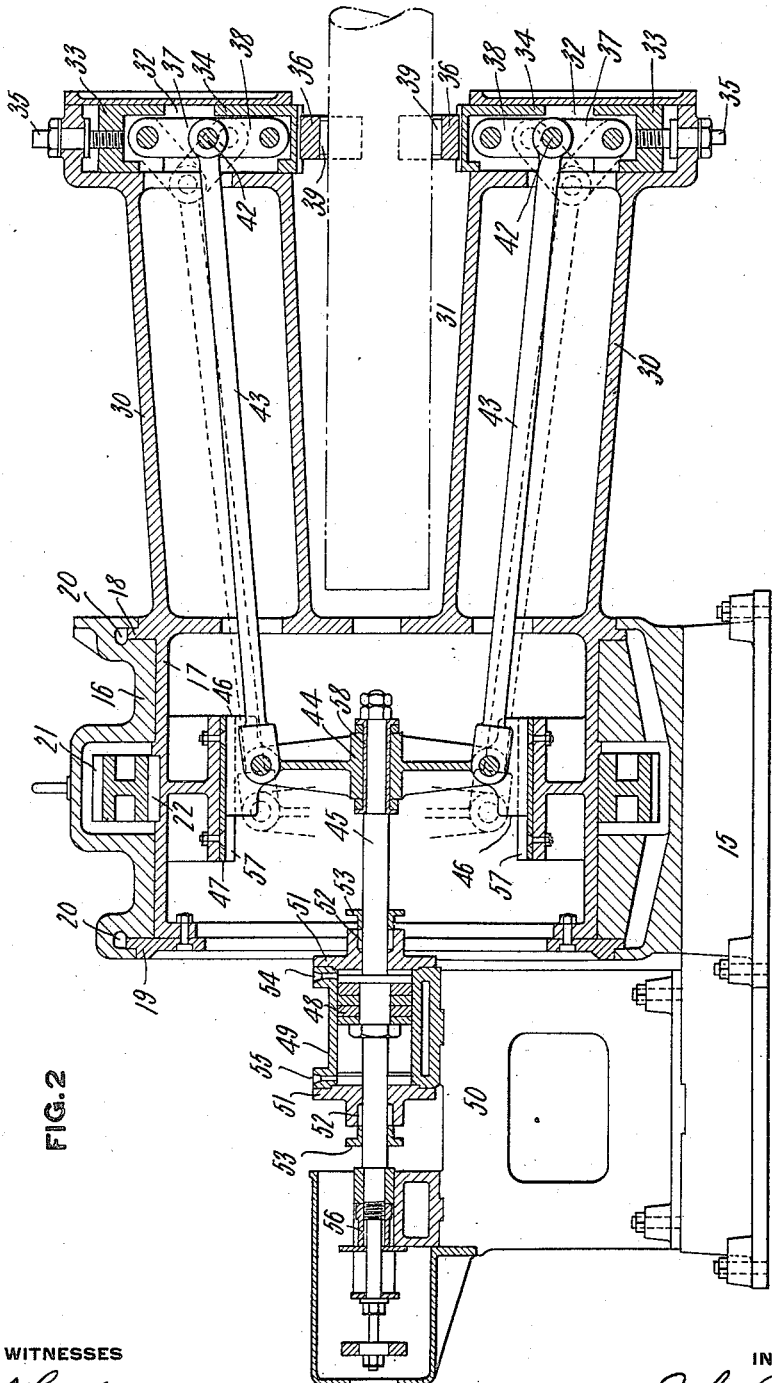
Figure 3:
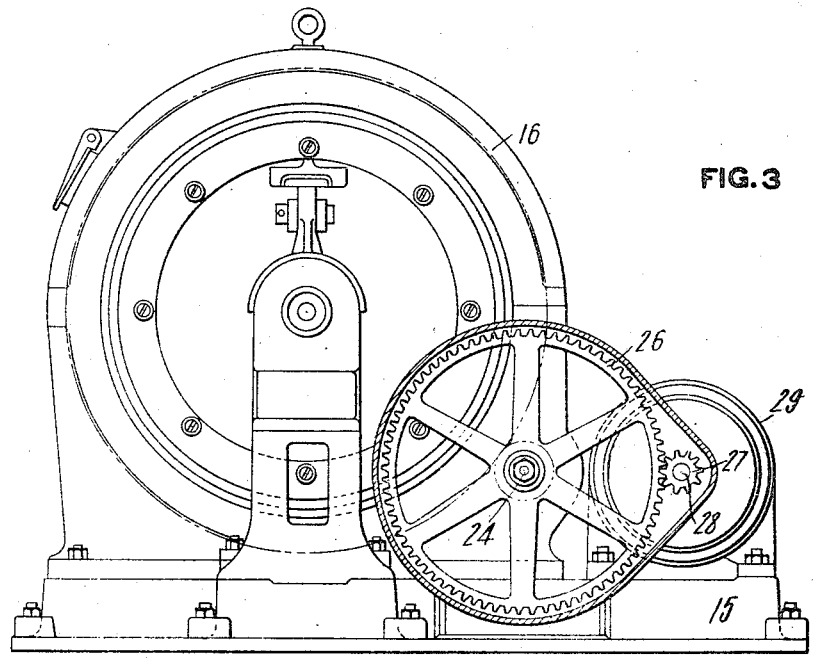
Figure 4:
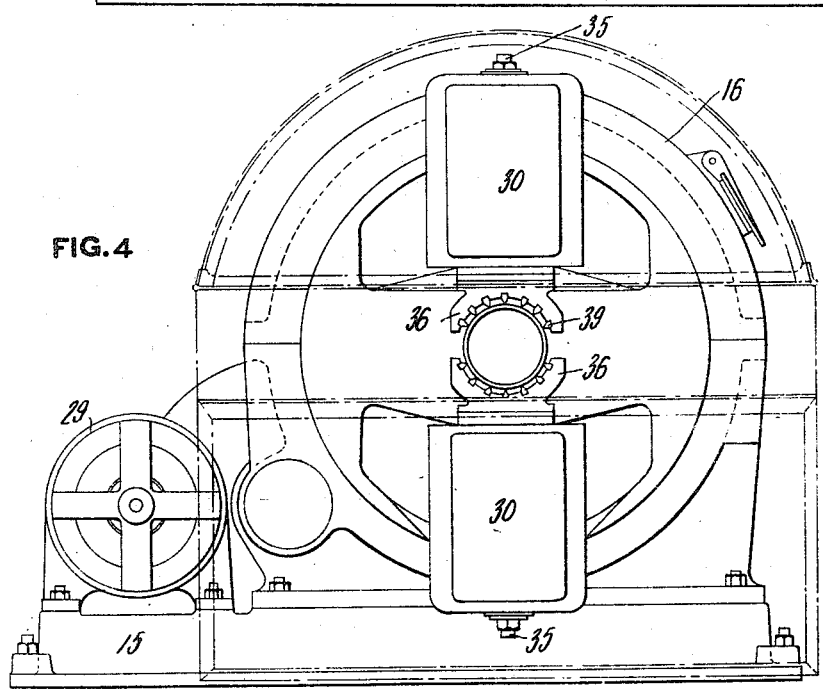

Referring now to the drawings, forming part of this specification, Figure 1 is a plan, partly in section, showing the pipe gripping and rotating mechanism of a pipe threading machine constructed and arranged in accordance with my invention. Fig. 2 is a longitudinal sectional elevation of the apparatus shown in Fig. 1. Fig. 3 is a rear end elevation of the pipe gripping and turning mechanism in Figs. 1 and 2. Fig. 4 is a front end elevation of the apparatus shown in Figs. 1, 2 and 3, showing the gripping mechanism by which the pipe is engaged in holding and rotating the pipe during the pipe threading operation. Fig. 5 is a plan showing a preferred arrangement of a pair of pipe threading machines and skids or carrier in accordance with this invention. Fig. 6 is a side elevation of the apparatus shown in Fig. 5.

In the accompanying drawings referring now to Fig. 5 the numeral 2 designates oppositely facing pipe threading machines which are arranged on opposite sides of a bed or carrier 3, the pipes being rolled upon the carrier 3 into and out of position opposite the pipe threading machines.

One pipe threading machine 2 is in staggered relation relative to the other machine 2 and opposite each pipe threading machine is a pipe gripping and turning mechanism 4.

The bed or carrier comprises skids 5 and 6 which are adjustably secured on stands 7 so as to extend lengthwise in substantially a horizontal plane and which have anti-friction supporting rollers 8 at intervals in the length thereof, these rollers being mounted to rotate on a horizontal axis lengthwise parallel with the length of the skids.

Each threading machine 2 is provided with a carriage 9 which is arranged to travel along the length of the shears or ways 10 of the base plate 11, and mounted on each carriage 9 is a steady rest 12 which supports one end of the pipe during the threading operation. Thread cutting dies 13 of any approved form may be used on the thread cutting head 14 of the pipe threading machine.

One of the pipe gripping and turning mechanisms 4 is located opposite each pipe threading machine 2 so as to be in axial alinement with a pipe positioned to be engaged by the thread cutting dies 13 of a threading machine 2. This pipe gripping and turning mechanism comprises a base plate 15 having a sectional casing or housing 16 thereon, and rotatably mounted in the casing 16 is a cylindrical barrel 17. The flange 18 on one end and removable flange 19 on the opposite end of the barrel 17 are arranged to project into the annular grooves 20 in the sectional housing 16 as will be seen in Fig. 2.

The barrel 17 is provided, at an intermediate point in its length, with a spur gear 21 which is fastened by a key 22 to the barrel so as to turn the barrel when the gear is rotated.

Secured in bearings 23, 23 on one side of the casing is a counter-shaft 24 having a spur pinion 25 thereon meshing with the gear 21 on the barrel 17 and keyed or otherwise fastened on one end of the counter-shaft 24 is a spur gear 26 meshing with the spur pinion 27 on the armature shaft 28 of the driving motor 29. The driving motor is secured in place on the base 15 of the pipe turning mechanism.

Projecting horizontally outward from one side of the barrel 17 on diametrically opposite sides of the axis of rotation of the barrel, are hollow arms 30, 30 which are arranged to form a throat 31 therebetween into which the pipes extend when held by the gripping jaws of the pipe turning mechanism.

Adjustably mounted in the recess 32 in the outer end of each arm 30 are movable heads 33 and 34, the head 33 being held in adjusted position in the recess by means of the adjusting screw 35 and the opposite head 34 having a pipe gripping jaw 36 removably secured thereon, being pivotally connected to the head 33 by the toggle links 37 and 38. Removable bits 39 removably secured on the gripping face of the gripping jaws 36 engage with the pipe in holding and turning the pipe during the threading operations.

The gripping jaws 36 are removably secured on the heads so that jaws of varying dimensions may be employed to suit the various sizes of pipe threaded by the apparatus.

The toggle links 37—38 by which the gripping heads 34 are pivotally secured one to the other are connected together at their adjacent overlapping ends and are also connected by a pivot pin 42 at their overlapping ends to one end of a reach rod 43. The forked rear ends of the two reach rods 43 are pivotally connected to the outer ends of the cross-head 44 which is mounted on the end of the piston rod 45. The cross-head 44 is located within the hollow barrel 17 of the pipe turning head and a shoe 46 pivotally secured on each end of the cross head is mounted on the slide 47 formed for that purpose on the interior of the barrel 17 of the driving head.

The piston rod 45 has a double acting piston 48 thereon located within the double acting fluid pressure cylinder 49, which is mounted on a stand 50 on the base plate 15 at the rear end of the driving head or pipe turning mechanism.

The heads 50—51 on the ends of the cylinder are provided with a stuffing box 52 and a gland 53 of the usual construction and inlet ports 54 and 55 are provided on its ends to supply fluid pressure to the cylinder 49 on each of opposite sides of the piston 48. The rear end of the piston rod 45 projects through one of the stuffing boxes 52 and glands 53 and this end of the piston rod is provided with a threaded sleeve or nut 56 forming a stop by which the extent of reciprocating movement of the piston rod 45 is regulated and controlled.

The shoes 46 on the ends of the cross head engage with the recessed wear plates 57 removably secured on the ways or slides 47 on the interior of the driving head so as to rotate the cross-head 44 with the barrel 17, the cross-head turning on the bushing or bearing 58 provided for that purpose on the outer end of the non-rotating piston rod 45.

Each of the pipe threading machines 2 one of which is erected opposite each driving head or pipe turning mechanism 4, is provided with a cylinder 59, and piston rod 60 by which the carriage 9 of the threading machine is moved on the shears or ways 10, the outer end of the piston rod 60 being secured to the carriage and the cylinder 59 being fastened to a suitable foundation provided for that purpose alongside the threading machines.

In the operation of my improved apparatus the pipes or tubes, which have been cut to length, are transferred upon the skids 5 and 6 rolling the pipes or tubes thereon. A pipe or tube is delivered to and moved along the skids until engaged by the faces of the first pair of anti-friction rollers 8, 8 on the skids. These antifriction rollers are grooved so as to hold the pipes against further rolling movement and being freely rotatable facilitate endwise or lengthwise movement of the pipes on the skids, when such movement proves necessary or desirable. The pipe on the first pair of anti-friction rollers is then rolled forwardly on the skids 5, 6 until supported by the second set or pair of the antifriction rollers 8, 8. When in this position the pipe will be in axial alinement with the pipe threading dies 13 of the first threading machine 2 and the axis of rotation of the gripping jaws 36, 36 of the pipe gripping mechanism 4. In bringing the pipe gripping mechanism to rest after each threading operation, the driving head or barrel 17 is stopped with a center line through the lengthwise center of the gripping arms in 30—30 in a vertical plane. In this way the throat 31 formed between the arms by the arms is in position to permit a pipe being rolled on the skids from the position shown at A in Fig. 5, into that shown at B in this figure. This movement, which is effected without necessarily moving the tube endwise or parallel with its lengthwise center, brings the pipe into position to be engaged by the gripping jaws 36, 36 on the arms 30. Fluid pressure is then admitted to the port on the front end of the fluid pressure cylinder 49, the ports 54, 55 in this cylinder being connected by piping through a suitable four-way valve (not shown) with a source of fluid pressure. When fluid pressure is admitted to the port 54 on the cylinder 49 the piston 48 is moved to the rear end of the cylinder from the position shown in Fig. 2 and such movement of the piston and piston rod moves the cross-head 44 from the position shown in full lines into that shown by dotted lines in Fig. 2. This backward movement of the cross-head 44 moves the toggle links 37, 38 in each of the hollow arms 30 on the driving head 17 from the position shown in full lines into that shown by dotted lines in Fig. 2 so as to retract the gripping jaws 36 and release the pipe in the throat 31 of the driving head.

When a pipe has been positioned as at B in Fig. 6, the piston 48 in the cylinder 49 is caused to move forwardly so as to move the cross-head 44 and, through the connecting rods 43, 43, move the toggle links 37 and 38 from the position shown dotted in Fig. 2 into that shown by full lines. This movement of the toggle links causes the gripping jaws 36 to engage the pipe positioned in the throat 31 of the driving head. The motor 29 is then started to operate which through the connecting gearing turns the driving head 17 and the pipe held within the throat 31 by the gripping jaws. Before starting the driving head to rotate, the piston rod 60 in the cylinder 59 is caused to move by admitting fluid pressure to the stuffing box end of the cylinder so as to shift the carriage 9 on the ways 10 of the threading machine sufficiently to move the steady rest 12 into the pipe holding position shown in Figs. 5 and 6. After the pipe is started to rotate, the carriage 9 of the threading machine is moved farther on the ways 10 so as to bring the threading dies 13 into engagement with the end of the pipe. The pipe then continues to rotate, with one end thereof in engagement with the threading dies 13 of the threading machine 2 until a thread of the desired length has been cut on the pipe. The threading dies are then retracted to release and disengage them from the threads cut on the end of the pipe and fluid pressure is admitted to the cylinder 59 to move the carriage 9 on the ways 10 of the threading machine until again in the position shown in Figs. 5 and 6. Fluid pressure is also admitted to the cylinder 49 on the driving head to again move the cross-head 44 into the position shown in dotted lines in Fig. 2 and by this movement cause the gripping jaws 36—36 to retract and release the pipe in the throat 31 of the driving head and the driving head is caused to stop with the arms forming the throat in the position shown in Figs. 1—2, 5 and 6. After the gripping jaws 36 have been retracted as has just been described, the pipe, which is now threaded on one end, is rolled forwardly into the position shown at C. Another pipe which has been transferred to position A on the skids while the first pipe was being threaded, is then farther rolled on the skids until in position B, when the above described operations are repeated upon this second pipe. The pipe in position C which now has a thread on one end, is then rolled forwardly on the skids until in the position D which brings the pipe into thread cutting position between the second thread cutting machine 2 which is located on the opposite side of the skids 5 and 6 from the first thread cutting machine 2. The gripping jaws 36 of the driving head opposite this threading machine are then caused to engage the pipe in the manner as has been described, and after the carriage 9 of the threading machine is moved forwardly sufficiently for the steady rest 13 thereon to engage with and support the end of the pipe which is to be threaded, the motor 29 is then started to operate so as to rotate the driving head and the carriage 10 of the threading machine is moved farther by means of the fluid pressure cylinder 59 to bring the thread cutting dies 13 into cutting engagement with the unthreaded end of the pipe. After the pipe has been threaded the threading dies 13 are retracted and the carriage 9 is moved backwardly to clear the end of the now threaded pipe the gripping jaws are retracted and the gripping mechanism is stopped with the arms in the position shown in Fig. 2. The pipe is then rolled from the position D into the position E on the skids and another pipe having a thread in one end is rolled on the skids 5—6 from the position C into the position D and the thread cutting operations as have been described are carried out on this pipe to provide its second end with a suitable thread.

Pipes are successively placed in position A and are removed from the position E at the same speed as that at which they are threaded, so that the ends of the pipes are successively provided with a thread without turning the pipes end for end or without necessarily shifting the pipes endwise on the skids in bringing them into thread cutting position.

The advantages of my invention will be apparent to those skilled in the art. By the arrangement of driving heads and thread-cutting machine operations are successively carried out in a rapid and economical manner. The amount of manual labor necessary in handling the pipes is lessened and reduced to a minimum.

By the use of my improved driving head the necessity of moving the large pipes endwise always existing heretofore to bring them into thread cutting position is overcome and rendered unnecessary. The apparatus is simple and is easily kept in repair.

Modifications in the construction and arrangement of the parts may be made without departing from my invention as defined in the claims.

Obviously the construction and arrangement of apparatus shown and described may be used in cutting the pipes to length, or facing and reaming the pipes as well as in threading the pipes, and the invention as covered by the claims is intended to cover such operations.

I claim:

1. Pipe threading apparatus comprising skids forming a pipe support on which the pipes are moved into threading position, a thread cutting machine on one side of said support, and a pipe turning mechanism on the opposite side of the support having an open sided throat through which the pipe is rolled in placing and removing pipes in threading position on said support.

2. Pipe threading apparatus comprising skids forming a support on which the pipes are moved into and out of threading position, thread cutting machines on opposite sides of said support, and a pipe gripping and turning mechanism on each side of the support and in line with a thread cutting machine, said pipe gripping and turning mechanisms having an open sided throat through which the pipes are rolled into and out of thread cutting position between the jaws of said gripping and turning mechanisms.

3. In a pipe threading machine, a pipe turning mechanism comprising a rotating barrel having projecting arms forming an open sided throat, said throat extending lengthwise parallel with the axis of rotation of said barrel, a barrel support, means for rotating the barrel and arms, relatively movable pipe gripping jaws mounted on the arms, said jaws being arranged to grasp and turn the pipe during the pipe threading operations and means for opening and closing said jaws.

4. In a pipe threading machine, a pipe turning mechanism comprising a rotating barrel having projecting arms forming an open sided throat, said throat extending lengthwise parallel with the axis of rotation of said barrel, a support for the barrel, means for rotating the barrel and arms, relatively movable pipe gripping jaws adjustably mounted on the outer ends of said arms and arranged to grasp and turn the pipe during the pipe threading operations, means for relatively adjusting said jaws and means for opening and closing said jaws.

5. In a pipe threading machine, a pipe turning mechanism comprising a rotating barrel having projecting arms forming an open sided throat, said throat extending lengthwise parallel with the axis of rotation of said barrel. a barrel support, means for rotating the barrel, relatively movable pipe gripping jaws mounted on the outer ends of said arms, said jaws being arranged to grasp and turn the pipes in the threading operations, toggles connecting the jaws and arms, a fluid pressure cylinder for actuating the jaws, a cross-head on the piston rod of said cylinder, and links connecting the cross-head and toggles for actuating the toggles when the piston is moved in said cylinder.

6. In a pipe threading machine, a pipe turning mechanism comprising a rotating barrel having projecting arms forming an open sided throat said throat extending lengthwise parallel with the axis of rotation of the barrel, a barrel support, means for rotating the barrel, relatively movable pipe gripping jaws mounted on the outer ends of said arms said jaws being arranged to grasp and turn the pipes in the threading operations, toggles connecting said jaws to the arms, a jaw actuating cylinder, a cross-head rotatably mounted on the piston rod of said cylinder, links connecting the cross-head and toggles, for actuating the toggles when the piston is moved in said cylinder and means for adjusting the gripping jaws on said arms.

7. In a pipe threading machine, a pipe turning mechanism comprising a rotating barrel having projecting arms forming an open sided throat therebetween, said throat extending lengthwise parallel with the axis of rotation of said barrel, a barrel support, means for rotating the barrel and arms, relatively movable pipe gripping jaws on the outer ends of said arms, said jaws being arranged to grasp and turn the pipe in the threading operations, toggles connecting said jaws and arms, a cylinder, a rotating cross-head on the piston rod of said cylinder for actuating said toggles, in moving the jaws into and out of pipe grasping position, links connecting the toggles with said cross-head and coacting means on the barrel and cross-head for rotating the cross head with the barrel.

8. In a pipe threading machine a pipe turning mechanism comprising a rotating barrel having projecting arms on one end thereof, said arms forming an open sided throat therebetween, and said throat extending lengthwise parallel with the axis of rotation of the barrel, a barrel support, means for rotating the barrel and arms, relatively movable pipe gripping jaws on the arms arranged to grasp and turn the pipe in the threading operations, toggles connecting said jaws to the arms, a fluid pressure cylinder, a rotating cross-head on the piston rod of said cylinder for actuating said toggles in moving the jaws into and out of pipe gripping position, links connecting the toggles with said cross-head, coacting means on the barrel and cross-head for rotating the cross-head with the barrel and an adjustable stop for limiting the reciprocating movement of said cross-head.

9. Pipe threading apparatus comprising skids forming a pipe support on which the pipes are moved into threading position, a thread cutting machine on one side of said support, said threading machine having a steady rest thereon to support one end of the rotating pipe in the thread cutting operations, and a pipe turning mechanism on the opposite side of the support having an open sided throat through which the pipe is rolled in placing and removing pipes in threading position on said support.

10. Pipe threading apparatus comprising skids forming a pipe support on which the pipes are moved into threading position, a thread cutting machine on one side of said support, said threading machine having a steady rest thereon to support one end of the rotating pipe in the thread cutting operations, a pipe turning mechanism on the opposite side of the support having an open sided throat through which the pipe is rolled in placing and removing pipes in threading position on said support, and means for moving the pipe threading machine to move the steady rest into holding engagement with the pipe.

In testimony whereof, I have hereunto set my hand.

JOHN J. BOAX.

Witnesses:
F. E. BROWN,
BRYANT BANNISTER.